United States Patent [19]

Okano et al.

[11] 3,966,443

[45] June 29, 1976

[54] EXHAUST GAS PURIFIER FOR INTERNAL COMBUSTION ENGINE

[75] Inventors: Ryoichi Okano, Nagoya; Tsuchio Bunda; Shinichiro Mizusawa, both of Okazaki; Akiyoshi Morita, Toyota, all of Japan

[73] Assignees: Toyota Jidosha Kogyo Kabushiki Kaisha, Toyota; Kabushiki Kaisha Tsuchiya, Nagoya, both of Japan

[22] Filed: Apr. 15, 1974

[21] Appl. No.: 460,895

[30] Foreign Application Priority Data
Apr. 18, 1973 Japan.........................48-043981

[52] U.S. Cl. ................................. 55/337; 23/288 F; 55/456; 60/282; 60/299; 60/311; 181/67
[51] Int. Cl.² ........................................ B01D 50/00
[58] Field of Search............... 55/DIG. 30, 337, 456, 55/457, 276; 23/288 F; 60/282, 297, 299, 311; 181/50, 66, 67

[56] References Cited
UNITED STATES PATENTS

| 472,308 | 4/1892 | Mosher | 55/456 |
| 735,192 | 8/1903 | Allert | 55/456 |
| 1,797,310 | 3/1931 | Wright | 181/67 |
| 3,633,343 | 1/1972 | Mark | 55/337 |
| 3,641,745 | 2/1972 | Moore | 55/457 |

Primary Examiner—Bernard Nozick
Attorney, Agent, or Firm—Brisebois & Kruger

[57] ABSTRACT

An exhaust gas purifier for internal combustion engine, has a porous filter impregnated with a desired adsorbent or a porous filter made of bulk metal catalyst. Instead of extending perpendicular to the main axial direction of the exhaust pipe, the filter extends axially and is mounted on a metal screen cylinder having a baffle which diverts the flow of exhaust gas toward and through the cylinder and filter. In this manner, the exhaust gas flows axially into the screen cylinder and then passes radially through the filter to a second flow passage which is connected to the purifier outlet. Very low back pressure is obtained with this arrangement.

6 Claims, 7 Drawing Figures

Fig. 1
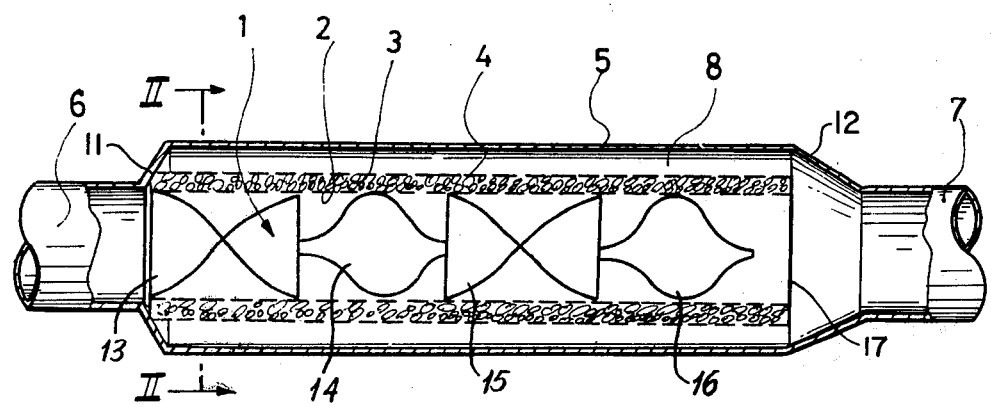
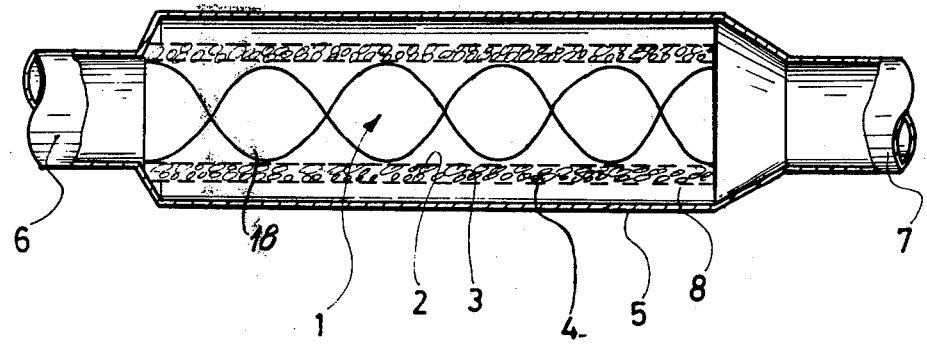
Fig. 3
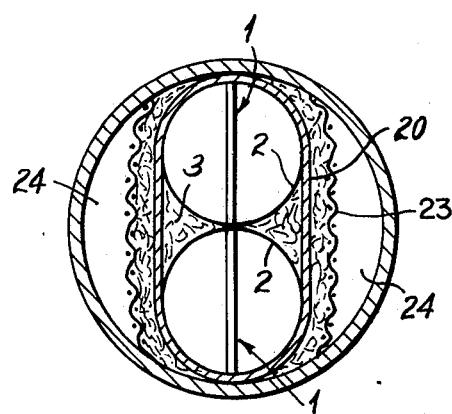
Fig. 5

EXHAUST GAS PURIFIER FOR INTERNAL COMBUSTION ENGINE

BACKGROUND OF THE INVENTION

The exhaust gas from the internal combustion engine contains harmful substances such as carbon monoxide, hydrocarbons, nitrogen oxides, fumes and particles of lead and lead compounds, and sulfur dioxide, which cause public nuisance.

In the conventional internal combustion engine where the filter extends perpendicular to or across the main axial direction of the exhaust pipe, a fine mesh filter results in a high back pressure in the exhaust and accordingly in a drop of the engine shaft output and its power; and if the filter mesh is broadened to reduce the back pressure, the contact between the filter and the exhaust gas for adsorption and reaction decreases, resulting in deterioration of the purifying effect of the filter.

SUMMARY OF THE INVENTION

The present invention aims at providing a purifier of harmful substances in the exhaust gas, characterized by a porous filter impregnated with an adsorbent which removes such substances in the exhaust gas through adsorption or reaction and releases a purified gas into the atmosphere. The invention also relates to a purifier, characterized not only by the porous filter being impregnated with an adsorbent but also by the filter itself being fabricated of a bulk metal catalyst, whereby a reaction of oxidation or reduction occurs which purifies the exhaust gas.

In accordance with the invention, such purification of the exhaust gas is accomplished while minimizing back pressure in the exhaust system. The minimized back pressure is obtained by arranging the filter axially of the exhaust, introducing the exhaust gas into a first flow passage within the filter, and providing a baffle which causes the exhaust gas to flow outwardly through the tubular or cylindrical filter into a second flow passage outside the filter and which communicates with the purifier outlet. The baffle can take the form of one or more twisted strips which cause outward flow of the exhaust gas along a substantial length of the filter while minimizing back pressure build up.

Other features and advantages will become apparent by reference to the following specification and drawings.

BRIEF DESCRIPTION OF THE DRAWINGS

FIG. 1 is a longitudinal sectional view of a first embodiment of the exhaust gas purifier of this invention;

FIG. 3 is a longitudinal sectional view showing a second embodiment of the invention;

FIG. 5 is a view in section taken along line V—V of FIG. 4;

DETAILED DESCRIPTION OF THE INVENTION

Figure 2:
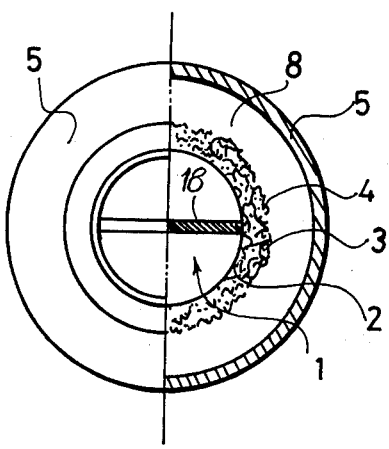
FIG. 2 is a view in half section taken along line II—II of FIG. 1.

One embodiment of the exhaust gas purifier of this invention will now be described with reference to FIGS. 1 and 2. As shown in FIG. 1, a baffle 1 in the form of a series of core elements extends through a tube 2 surrounded by a porous filter 3 disposed within and filling an annular space between tube 2 and a larger diameter outer tube 4. Tubes 2 and 4 are each cylindrical and can take the form of a screen, a porous tube, of a perforated tube, of metal or other heat resistant material. At one end of a casing 5 is a tubular inlet 6, and at its other end is a tubular outlet 7. It will be observed from FIG. 1 that inner tube 2 has a diameter approximating the inside diameter of inlet 6 but can be slightly less than the inside diameter of inlet 6 so some exhaust gas flows through the front annular face 10 of porous filter 3. Tube 4 is secured to a conical connector portion 11, for example by welding. The mounting of the elements 1–4 is such that tubes 2 and 4 are concentric with the axis of casing 5, and an annular space 8 is provided between the outer surface of tube 4 and the inside surface of the casing 5. Suitable supports (not shown) can be placed in the space between casing 5 and tube 4, and between tubes 2 and 4 to maintain the tubes in a centered position with respect to the casing.

The main body portion of casing 5 is connected to outlet 7 by a converging conical section 12 which provides for smooth gas flow from annulus 8 to the outlet 7.

Baffle 1 can take the form shown in FIG. 1, where the baffle includes a plurality of twisted flat metal strip core elements 13–16 arranged end to end which extend the length of tube 2 and which are each dimensioned to be a close fit within the tube. Alternate ones, 13 and 15, of these core elements are arranged with their end edges at a predetermined angle with respect to the end edges of the adjacent elements. This angle can be 90°. Each strip element has a 180° twist between its leading and trailing edge. The helical angle of this twist is preferably less than 45° to minimize back pressure.

Preferably, the alternate elements 13 and 15 are twisted so they have a helix of an opposite hand to elements 14 and 16. This is shown more clearly in FIG. 6 where a first element 13 is twisted to form a right hand helix, whereas the second element 14 is twisted to form a left hand helix. Good results are also obtained where the elements 13–16 are all twisted in the same direction.

The inside of tube 2 provides a first passage for the gas and the elements 13–16 each divide the tube 2 into two separate channels for the passage of gas. The helical twist in each of these elements causes the gas passing through tube 2 to be thrown outwardly toward the inside surface of the tube 2, so that the gas is diverted and directed through porous filter 3 which purifies the gas, and from which it flows into the annulus 8, which forms a second passage for flow of the gas. This action is enhanced by arranging alternate elements at right angles to each other and having the twist of the alternate elements in opposite directions, as previously explained. In addition, the twisted strip baffles provide a mixing action and good heat transfer without causing objectionable back pressure at inlet 6.

It has been found that with this arrangement, very little unpurified exhaust gas exits from the end 17 of the tube 2. Instead, substantially all the gas passes outwardly through filter 3 into the annular space 8, the gas passing through the filter being purified by the filter.

FIG. 3 shows a second embodiment of exhaust gas purifier according to the invention. The embodiment of FIG. 3 is substantially the same as the embodiment of FIG. 1 save that, baffle 1 takes the form of an elongated twisted metal strip 18, which is twisted in the same direction along its length and is located within tube 2. The width of the strip from which twisted strip 18 is formed is such that the twisted strip 18 is a close fit in tube 2. This strip extends the length of the tube 2. With the exception of the twisted strip 18, the embodiment of FIG. 3 is identical to the embodiment of FIG. 1.

Figure 4:
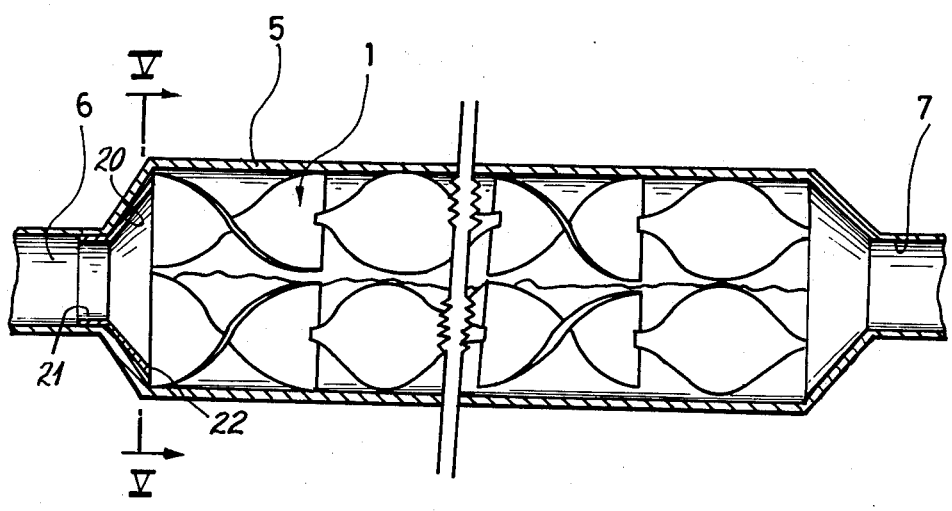
FIG. 4 is a partial view in longitudinal section showing another embodiment of the gas purifier.

FIGS. 4 and 5 show another embodiment of the exhaust gas purifier. In this embodiment, casing 5 is cylindrical, and a pair of tubes 2 extend the length of casing 5. The tubes are adjacent to each other and have their centers along the same diameter of the casing, as shown in FIG. 5. At inlet 6, there is an inlet duct 20 with a cylindrical inlet end 21 and an oblong outlet end 22 which directs gas from inlet 6 into the region of tubes 2 and filter 3. The baffle arrangement 1 within the tubes causes the gases to flow through filter 3 and through an outer porous wall or screen 23 (which is the equivalent of tube 4 of the embodiment of FIG. 1) into the crescent shaped gas flow spaces 24 between screen 23 and the inside of casing 5. The purified gas in the spaces 24 flows through outlet 7.

By virtue of the greater surface area within the tubes 2 in the embodiment of FIGS. 4 and 5, and the correspondingly, greater volume of the filter 3, good purification of the gas is obtained with this embodiment.

Figure 6:
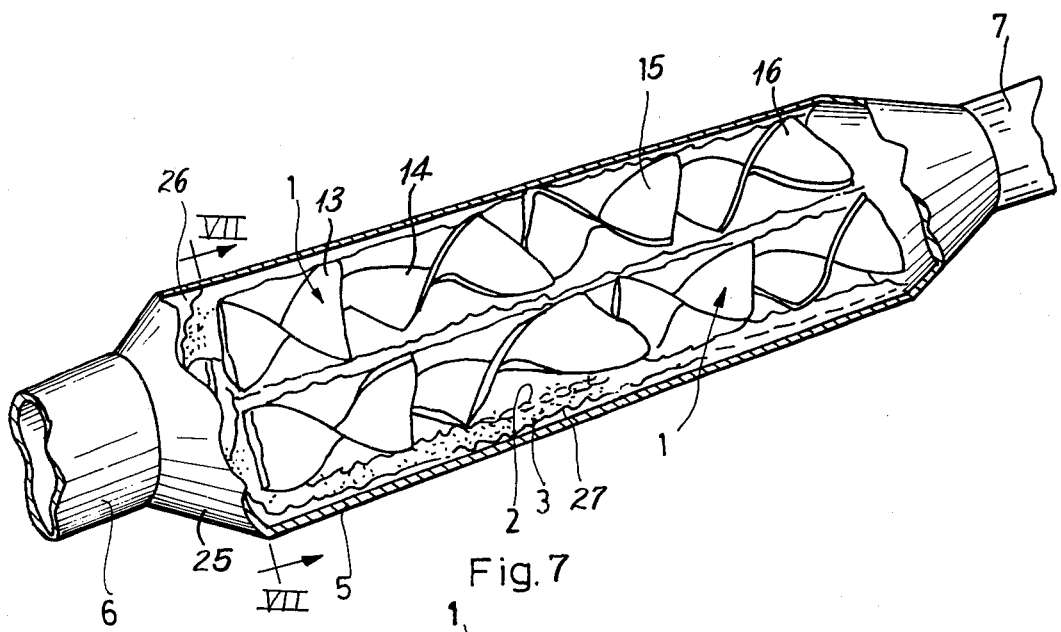
FIG. 6 is a pictorial view of another embodiment of the invention, with portions of the casing cut away for purposes of illustration.
Figure 7:
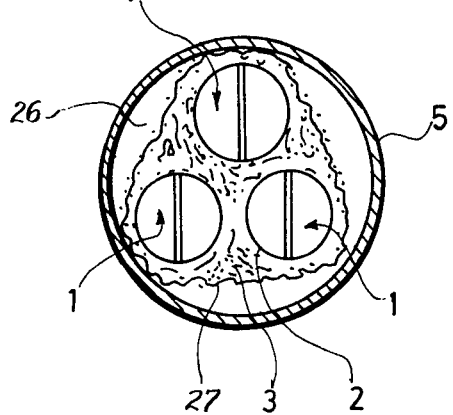
FIG. 7 is a view in section taken along line VII—VII of FIG. 6.

In the embodiment of FIGS. 6 and 7, there are three tubes 2 arranged in a generally triangular pattern within casing 5. The inlet duct portion 25 of casing 5 is generally triangularly configured so the exhaust gas flowing into the unit will enter tubes 2 and the end face of filter 3. This arrangement causes all the gas to flow through the filter so that only purified gas reaches the flow passes 26 at the outside of outer element 27 which retains the filter in position. The action of the exhaust gas in the individual tubes 2 is the same as that explained for the embodiment of FIG. 1.

Baffles 1 and 18 can be formed from several different substances to enhance the purifying action of this gas purifier. Tube 2, filter 3, and tube 4, and porous walls 23 and 27 can also take several different forms to enhance exhaust gas purification.

In one form of the invention, tube 2 takes the form of a metal screen cylinder, filter 3 is steel wool, and tube 4 is a metal screen. The entire assembly of tube 2, steel wool filter 3, and tube 4 are impregnated with an adsorbent so that the exhaust gas, when passing through the elements 2-4 has the contained fume and particles of lead and lead compounds, sulfur dioxide gas, and nitrogen oxides removed through adsorption. The impregnation of the adsorbent is such that the filter passages through the elements 2-4 will not be fully filled so gas can pass through the elements.

As the adsorbent with which the filter is impregnanted the following can be used: eutectic sodium carbonate ($Na_2CO_3$), potassium carbonate ($K_2CO_3$), and lithium carbonate ($Li_2CO_3$); such substances readily react with acidic gas, liquid or solid; and therefore they can react with sulfur dioxide gas or nitrogen oxides in the exhaust gas. The following are typical reactions:

$$M_2CO_3 + SO_2 \rightarrow M_2SO_3 + CO_2$$

$$M_2CO_3 + 2NO_2 \rightarrow MNO_2 + MNO_3 + CO_2$$

where M denotes ions of lithium, sodium or potassium. The above two reactions show that sulfur dioxide gas and nitrogen oxides in the exhaust gas are adsorbed by a react with molten alkaline metal carbonate and what is released outside is a harmless carbonic acid gas. Meanwhile, since lead halide found in some exhaust gas is an acidic substance, the adsorbent also causes the following reaction:

$$M_2CO_3 + PbCl_2 \rightarrow 2MCl + PbO + CO_2$$

and as the result, MCl and PbO are left on the filter; and carbonic acid gas is released into the atmosphere. The effectiveness of these adsorbents is well-known in the art.

Arrangements of the present invention which provide good results as gas purifiers are:

1. Tubes 2 and 4 (or walls 23 and 27) in the form of metal screens which retain a steel wool filter 3 impregnated with an adsorbent. Baffles 1 and 18 divert the gas flow toward the inner wall of the tube 2 so it is purified as it flows through the filter. A twist or helical angle of the baffle was set at less than 45° to maintain back pressure at a minimum while obtaining flow of substantially all the exhaust gas through the filter.

2. An arrangement where anyone or all of the tubes 2 and 4 (or the walls 23 and 27) and filter 3 are made of catalyst metal like platinum, palladium, nickel, or copper. With this arrangement the twisted baffle 1 is employed as the catalyst bed.

3. An arrangement where tubes 2 and 4 (or walls 23 and 27) and the filter 3 are combined into an integral unit of continuous foamed material such as a sintered alloy, and the catalyst metal is coated or plated on surfaces of the sintered alloy.

4. An arrangement where tubes 2 and 4 (and walls 23 and 27) and filter 3 are made of a non-catalyst material, with the catalyst metal coated, plated or otherwise adhered to these elements.

5. A baffle 1 made of porous plates continuously foamed, such as sintered alloy, with the catalyst metal coated, plated, or otherwise carried thereon.

6. The filter 3 and/or the tubes 2 and 4 (and walls 23 or 27) from a bulk metal catalyst.

When the device of this invention is installed at the exhaust outlet or in the exhaust system of an internal combustion engine, it is possible to eliminate harmful substances from the exhaust gas and release a harmless gas into the atmosphere, without unnecessarily elevating the back pressure in the exhaust system of the engine.

When the rpm of the engine is low, the content of nitrogen oxides in the exhaust gas is equally low; but when the rpm is increased, the burning temperature in the engine correspondingly rises, resulting in an increased generation of nitrogen oxides and accordingly in an increased content of nitrogen oxides in the exhaust gas. Meanwhile, increased engine speed means increased volume and flow rate of exhaust gas per unit time, which causes an increase in the volume of gas which hits the baffle and is reflected toward the side wall of tube 2 and in the volume of gas flow through the filter, resulting in an increased effect of nitrogen oxides being removed.

When the present device is installed in a catalyst converter equipped system, midway between the secondary air intake of the exhaust system and the oxidizing catalyst converter, not only is the mixing of the original exhaust gas of the engine with the secondary air improved, but also lead, lead compound, sulfur etc. which causes catalyst poisoning are preliminarily removed or lessened, thereby improving the effect, durability and life of the catalyst converter.

The present invention is advantageous in that it can adsorb and react with harmful substances in the exhaust gas; it exhibits high purifying ability; it does not decrease the engine output; it is simple in constitution and action, it is easy to repair; and it is variously applicable for purification of exhaust gas.

What is claimed is:

1. An exhaust gas purifier comprising, a casing, at least one porous tube surrounded by porous filter means within the casing, said porous tube having an interior and an exterior, said tube and casing having a gas flow space between said casing and the exterior of said tube; gas inlet means at one end of the casing for directing gas into the interior of said porous tube, and gas outlet means at the other end of the casing for receiving gas from said gas flow space; baffle means in said tube for mixing gas from said inlet and for diverting gas through said porous tube and into the gas flow space, said baffle means comprising, a series of flat plates each twisted at least 180° between end edges thereof and aligned with the porous tube, end edges of adjacent plates being at right angles to each other so that the mixing action of the plates is enhanced.

2. An exhaust gas purifier according to claim 1 wherein the purifier further includes second and third porous tubes like and beside said at least one tube and each including porous filter means and within the casing, said tubes being disposed with their axes generally parallel and triangularly arranged within the casing, and baffle means like said aforementioned baffle means within said second and third porous tubes; said gas inlet means directing gas into the interiors of said tubes.

3. An exhaust gas purifier according to claim 1 wherein said porous filter means is impregnated with an adsorbent.

4. An exhaust gas purifier according to claim 1 wherein, alternate ones of said series of plates are twisted in opposite directions to further enhance mixing of gases in the interior of the porous tube.

5. An exhaust gas purifier according to claim 1 wherein said purifier further comprises, a second porous tube surrounded by said porous filter means and generally parallel with and beside said at least one porous tube, said second tube being like said at least one tube; and a series of baffle elements like said aforementioned baffle elements within said second porous tube, said gas inlet means directing gas into the interiors of said porous tubes.

6. An exhaust gas purifier according to claim 5 wherein said casing is cylindrical, and said gas flow space comprises first and second gas flow spaces, each of generally crescent shape, and between the casing and the porous tubes.

* * * * *